Nov. 10, 1964 W. B. GILES 3,156,207
CONTROL DEVICE FOR BOUNDARY LAYER CONTROL VEHICLE
Filed Jan. 9, 1961 2 Sheets-Sheet 1
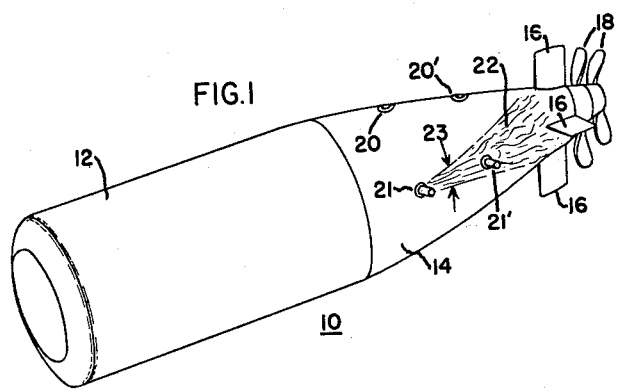
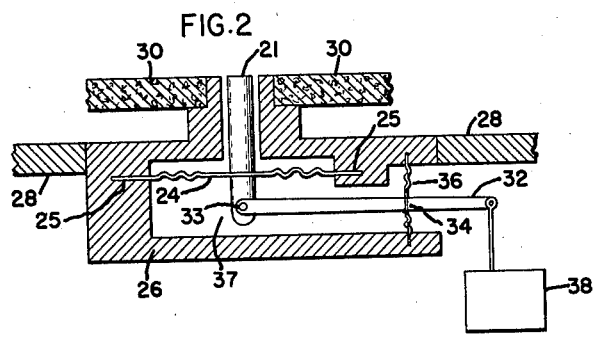
INVENTOR:
WALTER B. GILES,
BY T.E. Kristofferson
HIS ATTORNEY.

Nov. 10, 1964  W. B. GILES  3,156,207
CONTROL DEVICE FOR BOUNDARY LAYER CONTROL VEHICLE
Filed Jan. 9, 1961  2 Sheets-Sheet 2
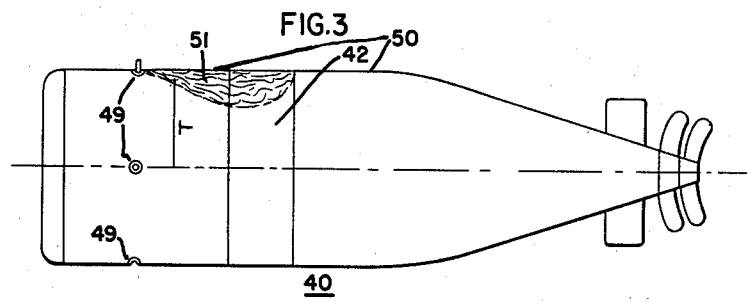
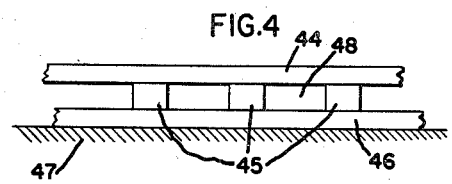
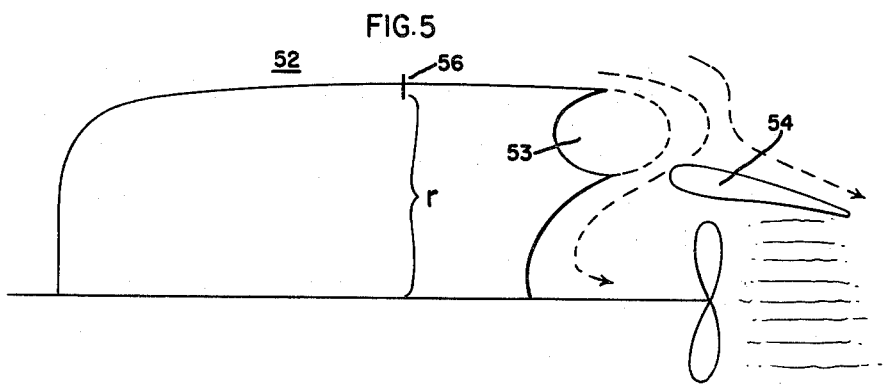
INVENTOR:
WALTER B. GILES,
BY T. E. Kristofferson
HIS ATTORNEY.

United States Patent Office 3,156,207
Patented Nov. 10, 1964

3,156,207
CONTROL DEVICE FOR BOUNDARY LAYER
CONTROL VEHICLE
Walter B. Giles, Pittsfield, Mass., assignor to General
Electric Company, a corporation of New York
Filed Jan. 9, 1961, Ser. No. 81,378
4 Claims. (Cl. 114—23)

This invention relates to a means for controlling the direction of a vehicle moving in a fluid and more particularly to such a means for controlling the direction of an underwater vehicle provided with laminar flow by creating controlled turbulence.

In the prior art torpedoes have been provided with directional control, and pitch, yaw and roll stabilization by means of fins or drag creating devices which present a relatively large surface to deflect the direction of flow. Any such device which is normally out in the flow necessarily causes drag even during steady state conditions under which the vehicle is not turning. Accordingly it is an object of this invention to reduce the overall drag on a vehicle moving in a fluid.

Another object is to provide directional control to a vehicle provided with a controlled laminar boundary layer flow.

Still another object of this invention is to provide a steering mechanism for a vehicle employing controlled turbulence for interrupting normal laminar flow to provide directional control and pitch and yaw stabilization.

A further object of this invention is to provide a torpedo with laminar flow and means for interrupting such flow at selected locations to create a drag for directional control purposes.

In carrying out the invention in one form thereof, a torpedo having a porous outer hull used to create laminar flow is provided with at least three (3) control pins or other devices contained in the hull and capable of outward extension into the boundary layer. These pins are spaced apart around a lateral section of the hull and are provided with actuating means for extending them outwardly into the laminar flow upon the receipt of a signal indicating a desired change in direction. When extended, a pin interrupts the laminar flow causing turbulence along a section of the hull behind the pin within a relatively small included angle which creates an increased drag on one side of the hull producing a turning moment. The torpedo also will normally be provided with roll stabilization fins which however may be of a reduced size from the ordinary fins.

The novel features which are believed to be characteristic of the invention are set forth with particularity in the appended claims. The invention itself, however, together with further objects and advantages thereof, can best be understood by reference to the following description taken in conjunction with the accompanying drawings in which:

FIG. 1 is a perspective view of a torpedo employing the invention;

FIG. 2 is a partial longitudinal section of the hull of the torpedo illustrated in FIG. 1 taken at one of the control pins to illustrate the pin mechanism;

FIG. 3 is a side view of a torpedo illustrating a modification of the embodiment disclosed in FIG. 1;

FIG. 4 illustrates a cross section of the compliant surface of FIG. 3; and,

FIG. 5 is a half side view of the hull of a torpedo in accordance with a further modification of the invention employing a trapped ring vortex.

Turning now to the drawings, FIG. 1 illustrates one embodiment of the invention in which a torpedo hull 10 is illustrated having a forebody section 12 and a tapered afterbody section 14. The afterbody section 14 is provided with roll stabilization fins 16 and propellors 18. Control pins 20 and 21 are illustrated in the fore portion of the afterbody 14. Control pin 20 is retracted flush with the hull 10 and control pin 21 is extended outwardly from the hull 10. An area of turbulence 22 within an included angle 23 is illustrated on the afterbody 14 of the hull 10 behind extended pin 21. The hull portions 12 and 14 may be constructed of a porous material for creating laminar flow around the hull 10 as it proceeds through the water.

A description of such a porous hull construction incorporating back flushing for clearing the pores of the hull is disclosed in copending U.S. patent application Serial No. 683,805 filed September 13, 1957, now Patent No. 2,969,759 entitled Hydrodynamic Drag Reduction in Vehicles Through Boundary Layer Control by Walter B. Giles and assigned to the same assignee as the present invention. Page 3 of the above referenced copending application refers to a method of steering control having separate sections with controllable suction sinks for providing controlled laminar flow. The present invention creates laminar flow over the entire vehicle hull which is then interrupted by outwardly extending one of the control pins such as 20 or 21 into the boundary layer. In the embodiment of FIG. 1 there would be two other control pins on opposite sides of the hull 10 from pins 20 and 21. Actually 3 such pins would suffice, however, the preferred embodiment would use at least 4 pins and perhaps an additional 4 pins located toward the stern of hull 10 such as 20', 21' etc. for additional fine control. Besides a pin structure any other structure which will cause turbulence preferably without appreciable form drag may be used.

FIG. 2 illustrates one example of how a pin 21 such as that employed in FIG. 1 may be suspended and operated. Pin 21 is supported on a spider spring 24 which is in turn supported at points 25 by insertion into support section 26. Section 26 is in turn joined to the pressure hull wall 28 and porous hull 30 as by bonding etc. Pin 21 is positioned vertically on horizontal spider spring 24 as illustrated. The top portion of pin 21 is flush with the outside of porous hull 30 but may be caused to extend outward from hull 30 by means of actuating arm 32 which is pivotally connected to pin 21 at point 33 and can be pivoted at point 34 in diaphragm 36. Diaphragm 36 is a sealing diaphragm for isolating the outside pressure from the interior of pressure hull 28 sealing off the inside 37 of section 26. This structure as illustrated is intended to minimize the effect of pressure variations on the motion of pin 21. Arm 32 is controlled from actuating means 38 which may be any of the customary sources for providing steerage motion to a torpedo such as a solenoid actuated by an amplifier which amplifies a position error signal.

Pin 21 may be extended approximately .25 inch into the laminar boundary layer flow and will destabilize the flow in a triangle wedge downstream of pin 21 having an included angle, such as 23 in FIG. 1, of approximately 10°. The resulting turbulent flow on the section of the hull within the included angle 23 causes a drag of approximately 7 to 9 times greater magnitude than that on the opposite side of the hull. Thus the vehicle surface, S, with the turbulent boundary layer has a skin friction drag, $D_f$, per unit area of approximately an order of magnitude higher than the diagonally disposed surface. This drag acts at a radius, $r$, from the vehicle axis of symmetry producing a turning moment, $M$, of $M=\int_S rD_f dS$. This control is an on-off control dependent on whether pin 21 projects above or is flush to porous hull surface 30. As indicated above a vernier control can be provided by placing a similar set of pins longitudinally displaced behind the first set. The pin 21 need only extend approximately .25 inch or less into the laminar flow since roughness elements greater than half the displacement thickness of the boundary layer are all that is required to trip the flow and create turbulence.

FIG. 3 illustrates another embodiment of the invention in which the torpedo hull 40 has a section 42 which is a compliant surface such as illustrated in FIG. 4. The compliant surface is composed of an outer flexible sheet, 44, supported by flexible mounts, 45, and bonded via sheet, 46, to the vehicle hull, 47. Viscous fluid is contained in space 48 between 44 and 46. The skin structure conforms to the wave motion of the turbulent boundary layer and the viscous fluid absorbs the turbulent energy and results in a laminarized boundary layer. The control pins 49 of FIG. 3 are shown located in the forward part of the torpedo hull 40. Both sections 50 of hull 40 forward and aft of compliant section 42 constitute porous suction surfaces. Thus, as illustrated, the turbulence 51 created behind the extended upper control pin 49 is damped out by compliant surface 42 and does not act on the after porous suction surface 50. The advantage of locating pins 49 in the forward part of the hull as opposed to locating them in the tapered afterbody is that the radius, $r$, is a maximum in this section increasing the resulting turning moment in accordance with the foregoing equation.

A further embodiment is illustrated in FIG. 5 which shows the upper half of a hull 52 which has no tapered afterbody due to the structure at its stern including pockets 53 and propeller duct 54 which serve to create a trapped ring vortex at the stern of the hull 52. Such a vortex obviates the need for a tapered afterbody shortening the torpedo. Also the control pin 56 may be located toward the stern of hull 52 in this embodiment and still take advantage of a relatively large radius $r$.

While particular embodiments of the invention have been illustrated it will be understood of course that it is not intended to limit the invention thereto since many modifications may be made, and it is therefore contemplated by the appended claims to cover any such modifications as fall within the true spirit and scope of the invention.

What is claimed as new and desired to be secured by Letters Patent of the United States is:

1. In an underwater vehicle having a hull with a porous suction surface providing laminar boundary layer flow the improvement comprising control means normally flush with said hull, means for extending said control means into said laminar boundary layer to trip said flow creating turbulence over a section of said hull downstream from said control means.

2. In combination, an underwater vehicle having a porous hull with associated suction means for providing laminar boundary layer flow over a substantial section of said hull, at least three control means normally flush with said hull laterally spaced around said hull, means for selectively extending said control means into said laminar boundary layer to trip said flow creating turbulence over a section of said hull downstream from said control means to create a turning moment on said vehicle in order to provide yaw and pitch control and stabilization, said control means having negligible form drag.

3. In combination, an underwater vehicle having a hull with a porous suction surface capable of providing laminar boundary layer flow, four control pins normally flush with said hull evenly spaced around a lateral plane perpendicular to the longitudinal axis of said hull, means for selectively extending said pins approximately halfway out into said boundary layer to trip said flow creating turbulence within an included angle downstream of said pins over a section of said hull, said pins having an area small enough to cause negligible form drag in said flow.

4. The combination of claim 3 having an additional four control pins located directly longitudinally aft from said first mentioned control pins for providing vernier control.

References Cited in the file of this patent

UNITED STATES PATENTS

| 2,520,433 | Robinson | Aug. 29, 1950 |
| 3,096,739 | Smith | July 9, 1963 |

FOREIGN PATENTS

| 797,933 | France | May 6, 1936 |
| 832,427 | France | Sept. 27, 1938 |

OTHER REFERENCES

Ernst: "Spoiler Control of Missiles," history of German guided missiles development, AGARD #20, 1957, pp. 39–49, U.S. Air Force Dictionary, April 1957.